(No Model.)
H. G. LANE.
VEHICLE WHEEL.
No. 387,685. Patented Aug. 14, 1888.
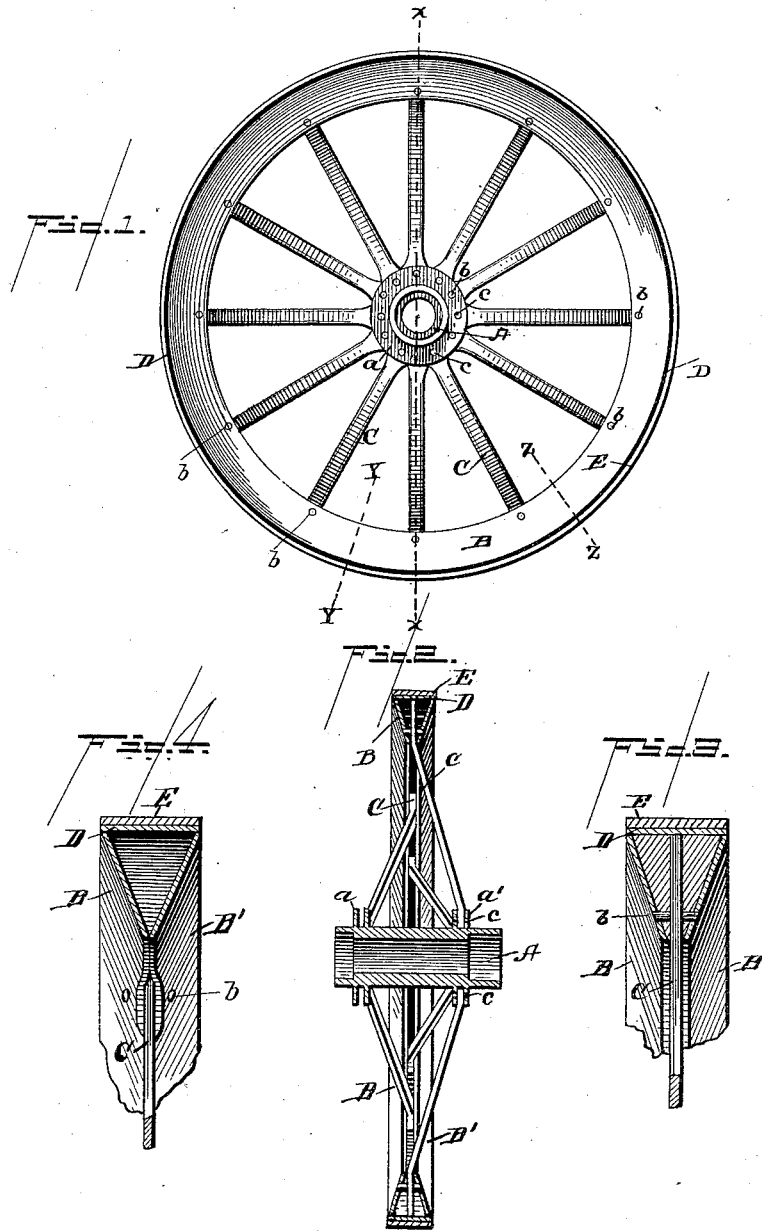
WITNESSES.
Edwin F. Yewell.
Van Buren Hillyard.
INVENTOR.
Henry G. Lane.
By R. S. & A. P. Lacey,
Attorneys.

UNITED STATES PATENT OFFICE.

HENRY G. LANE, OF BUCYRUS, OHIO.

VEHICLE-WHEEL.

SPECIFICATION forming part of Letters Patent No. 387,685, dated August 14, 1888.

Application filed March 10, 1888. Serial No. 266,810. (No model.)

*To all whom it may concern:*

Be it known that I, HENRY G. LANE, a citizen of the United States, residing at Bucyrus, in the county of Crawford and State of Ohio, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to vehicle-wheels, and aims to construct a wheel that can be manufactured at a comparatively small cost, and which will be compact and capable of withstanding great strain compared with the amount of material employed in its construction.

The improvement consists in the peculiar construction of the hub, which is made of metal, having a pair of annular flanges near each end thereof. The flanges are integral with the hub and have the inner ends of the spokes secured between them.

The improvement further consists in the novel construction of the rim, which is composed of two oppositely-flared rings, which are placed together, so that their inner edges come close to each other and their outer edges stand apart.

The outer or separated edges of the rings are united by a band, and the said two oppositely flared rings are integral with the said band. The tire is placed over this band, and the outer ends of the spokes, which are held between the rings, bear against the inner side of the said band. After the wheel is constructed, a slight space is left between the inner edges of the rings, which extends from one spoke to the other. This space may be closed by filling of any kind poured in between the rings, or by pressing the inner edges of the rings together, thereby excluding dirt, &c., which would otherwise lodge therein.

The improvement also consists in the novel features, which hereinafter will be more fully described and claimed, and shown in the annexed drawings, in which—

Figure 1 is a side view of a wheel constructed in accordance with the spirit of my invention; Fig. 2, a vertical section of the wheel on the line X X of Fig. 1; Fig. 3, a cross-section of the rim on the line Y Y of Fig. 1, on an enlarged scale; and Fig. 4 is a cross-section of the rim on the line Z Z of Fig. 1, on an enlarged scale, showing the inner edges of the rings brought together.

The hub A is tubular in form and is provided at or near each end with the pairs of annular flanges $a$ and $a'$, respectively, which are integral therewith. The spokes C have their inner ends inserted in the space between the flanges of each pair of flanges and held therein by the rivets or bolts $c$, that are passed transversely through the flanges.

The rim is composed of the two corresponding flared rings B and B', which are placed together, so that their inner edges approach close to each other and their edges stand apart or are separated. In other words, the rings diverge or flare outwardly from their inner edges and are united at their outer edges by the band D, said band D being integral with said flared rings. The tire E is placed over the band, and the outer ends of the spokes bear against the inner side of the band and are between the rings B and B' by the rivets or bolts $b$.

It will be observed that there is a space between the rings and the band and that the inner edges of the rings if left open will admit mud, dirt, &c., into this space. To obviate this objection, the said space is either filled in or the inner edges of the rings are brought together, as shown in Fig. 4.

Having thus described my invention, what I claim, and desire to secure by Letters Patent, is—

The herein shown and described metal wheel, composed of the tubular hub having a pair of annular flanges at or near each end thereof, the spokes held between the annular flanges, the rim consisting of the two oppositely-flared rings embracing the outer ends of the spokes, the band bearing against the ends of the spokes and uniting the outer edges of the rings, and the tire, substantially as specified.

In testimony whereof I affix my signature in presence of two witnesses.

HENRY G. LANE.

Witnesses:
 ISAAC CAHILL,
 D. C. CAHILL.